United States Patent
Raghavendra

(10) Patent No.: US 9,961,085 B2
(45) Date of Patent: May 1, 2018

(54) LINKING IDENTITIES IN A NETWORK ENTITY

(71) Applicant: Microsoft Technology Licensing, LLC, Redmond, WA (US)

(72) Inventor: Chetan Pentam Raghavendra, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 65 days.

(21) Appl. No.: 14/739,502

(22) Filed: Jun. 15, 2015

(65) Prior Publication Data

US 2016/0366145 A1 Dec. 15, 2016

(51) Int. Cl.
| | |
|---|---|
| *H04L 29/06* | (2006.01) |
| *G06F 21/30* | (2013.01) |
| *H04L 29/08* | (2006.01) |
| *G06Q 50/00* | (2012.01) |

(52) U.S. Cl.
CPC ............ *H04L 63/102* (2013.01); *G06F 21/30* (2013.01); *G06Q 50/01* (2013.01); *H04L 63/04* (2013.01); *H04L 63/08* (2013.01); *H04L 65/1069* (2013.01); *H04L 67/306* (2013.01)

(58) Field of Classification Search
CPC ...... G06F 21/30; H04L 63/0407; H04L 63/04
USPC .................. 726/4–6; 709/204–206; 715/756
See application file for complete search history.

(56) References Cited

U.S. PATENT DOCUMENTS

| | | | | |
|---|---|---|---|---|
| 9,356,939 | B1 * | 5/2016 | Gates | H04L 63/104 |
| 2006/0263133 | A1 * | 11/2006 | Engle | G06Q 10/00 400/62 |
| 2008/0134295 | A1 * | 6/2008 | Bailey | G06F 21/41 726/4 |
| 2008/0244419 | A1 * | 10/2008 | Kurpick | G06Q 10/00 715/756 |
| 2011/0023101 | A1 * | 1/2011 | Vernal | G06F 21/41 726/7 |
| 2013/0007122 | A1 * | 1/2013 | Su | G06Q 50/01 709/204 |
| 2013/0018960 | A1 | 1/2013 | Knysz et al. | |

(Continued)

OTHER PUBLICATIONS

International Search Report and Written Opinion for PCT Application No. PCT/US2016/037296, dated Jul. 22, 2016.

(Continued)

*Primary Examiner* — Jason C Chiang
(74) *Attorney, Agent, or Firm* — Workman Nydegger

(57) ABSTRACT

A network entity that allows collaboration among end users of a collaborative application by using different identifiers. The network entity receives an authentication request from a collaborative application to authenticate an end user. The network entity uses a first identifier of the end user that is associated with the network entity to verify that end user is permitted to use the collaborative application and informs the collaborative application that the end user is permitted to use the collaborative application. The network entity receives from the collaborative application a second identifier of the end user that is not associated with the network entity. The second identifier is linked to the first identifier. The network entity allows the second identifier to be used to authenticate the user with the collaborative application without the need to use the first identifier when a collaborative session is begun.

22 Claims, 7 Drawing Sheets

(56) References Cited

U.S. PATENT DOCUMENTS

| | | | |
|---|---|---|---|
| 2013/0066975 A1 | 3/2013 | Kantor et al. | |
| 2013/0091214 A1* | 4/2013 | Kellerman | G06Q 30/00 709/204 |
| 2013/0144945 A1 | 6/2013 | Said et al. | |
| 2014/0149592 A1* | 5/2014 | Krishna | G06F 1/329 709/226 |
| 2014/0189841 A1* | 7/2014 | Metke | G06F 21/40 726/9 |
| 2015/0149906 A1* | 5/2015 | Toff | G11B 27/031 715/723 |
| 2015/0278764 A1* | 10/2015 | Patil | G06Q 10/103 705/301 |
| 2016/0094584 A1* | 3/2016 | Mehta | H04L 63/205 726/1 |
| 2016/0226932 A1* | 8/2016 | Krishna | H04W 4/14 |

OTHER PUBLICATIONS

"Sign up for Google Apps—Google Apps Help", Retrieved on: Apr. 8, 2015 Available at: https://support.google.com/a/answer/53926.

"Invite users—Google Apps Help", Retrieved on: Apr. 8, 2015 Available at: https://support.google.com/a/answer/2942638?hl=en.

"Zoho Wiki", Published on: Aug. 15, 2015 Available at: https://zohowikihelp.wiki.zoho.com/enterprise-wiki-setup.html.

"Amazon WorkDocs", Retrieved on: Apr. 8, 2015 Available at: http://docs.aws.amazon.com/workdocs/latest/userguide/workdocs-ug.pdf.

"Dropbox for Business security", In White Paper, Retrieved on: Apr. 8, 2015, 18 pages.

"ZOHO Docs", Published on: Apr. 11, 2013 Available at: https://www.zoho.com/docs/help/getting-started-guide.html#createaccount.

"Aero", Retrieved on: Apr. 8, 2015 Available at: https://support.aerofs.com/hc/en-us/articles/201438884-How-do-I-work-with-people-outside-my-organization-.

"Collaboration", Published on: Sep. 21, 2013 Available at: http://www.qualtrics.com/university/researchsuite/basic-building/getting-started/collaboration/.

"Symantec Endpoint Protection Small Business Edition cloud Administrator's Guide", Retrieved on: Apr. 8, 2015 Available at: http://symhelp06.elasticbeanstalk.com/Content/EN_US/SEPSBE2013/docs/AdministratorGuide.pdf.

"Cloud and Web Application Authentication", Published on: Nov. 16, 2012 Available at: http://www2.safenet-inc.com/sas/cloud-and-web.html.

"Windows Live Cloud Identity Connector", Published on: Mar. 2013 Available at: http://documentation.pingidentity.com/download/attachments/12222682/Windows_Live_Cloud_Identity_Connector_User_Guide.pdf?version=2&modificationDate=1362160173207.

Molabanti, Shiva., "SAML—A go-to tool for Enterprise—Cloud Applications Security", Published on: Aug. 19, 2014 Available at: https://shivabizint.wordpress.com/tag/cloud-computing/.

2nd Written Opinion issued in PCT Application No. PCT/US2016/037296 dated May 18, 2017.

"International Preliminary Report on Patentability Issued in PCT Application No. PCT/US2016/037296", dated Aug. 17, 2017, 7 Pages.

* cited by examiner

LINKING IDENTITIES IN A NETWORK ENTITY

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

One type of computing system is a social network. A social network allows a large number of users to interact with each other socially and to access the services provided by the social network. In addition, a large number of applications that may not be owned by the social network may also register with the social network so that the users of the social network can access the services provided the applications.

The users will typically have a social identity such as an account that identifies each user in the social network. In some instances the applications use the social identity to authenticate the user so that the user can access the services of the application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein are related to systems and methods for a network entity to allow collaboration among end users of a collaborative application by using different identifiers. In one embodiment, a system includes a processor and a system memory. A receive module is configured to receive an authentication request from one or more collaborative applications. An authentication module is configured to use a first identifier for one or more end users that use the one or more collaborative applications. The first identifier is within a recognition domain and is used to verify that at least one end user is permitted to use at least one collaborative application. The authentication module is further configured to send second data to the collaborative application, the second data being structured to be interpretable by the collaborative application as meaning that the end user is permitted to use the collaborative application. A linking module is configured to receive a second identifier for the end user that is not at least initially in the recognition domain and to link the second identifier with the first identifier. This allows the second identifier to be used to authenticate the end user with the one of the one or more collaborative applications without the need to use the first identifier when the end user begins a collaborative session using the collaborative application.

Embodiments disclosed herein relate to methods for allowing collaboration among end users of a collaborative application by using an identifier of the end users that is different from a first identifier. A network entity receives an authentication request from a collaborative application to authenticate an end user. The network entity uses a first identifier of the end user that is associated with the network entity to verify that end user is permitted to use the collaborative application and informs the collaborative application that the end user is permitted to use the collaborative application. The network entity receives from the collaborative application a second identifier of the end user that is not associated with the network entity. The second identifier is linked to the first identifier. The network entity allows the second identifier to be used to authenticate the user with the collaborative application without the need to use the first identifier when a collaborative session is begun.

Embodiments disclosed herein relate to computer program products and methods for allowing a network entity to facilitate the creation of a collaborative session between one or more end users and one or more collaborative applications that are associated with the network entity. The network entity receives from a collaborative application an identifier for an end user that is not at least initially associated with the network entity. The network entity verifies that the identifier is linked with an authentication identifier. The authentication identifier is within a recognition domain of the network entity. This allows the authentication identifier to be used by the network entity to verify that the end user is permitted to use the collaborative application. The network entity sends data to the end user that is associated with the identifier. The data allows the end user to access the collaborative application to thereby begin a collaborative session in the collaborative application.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
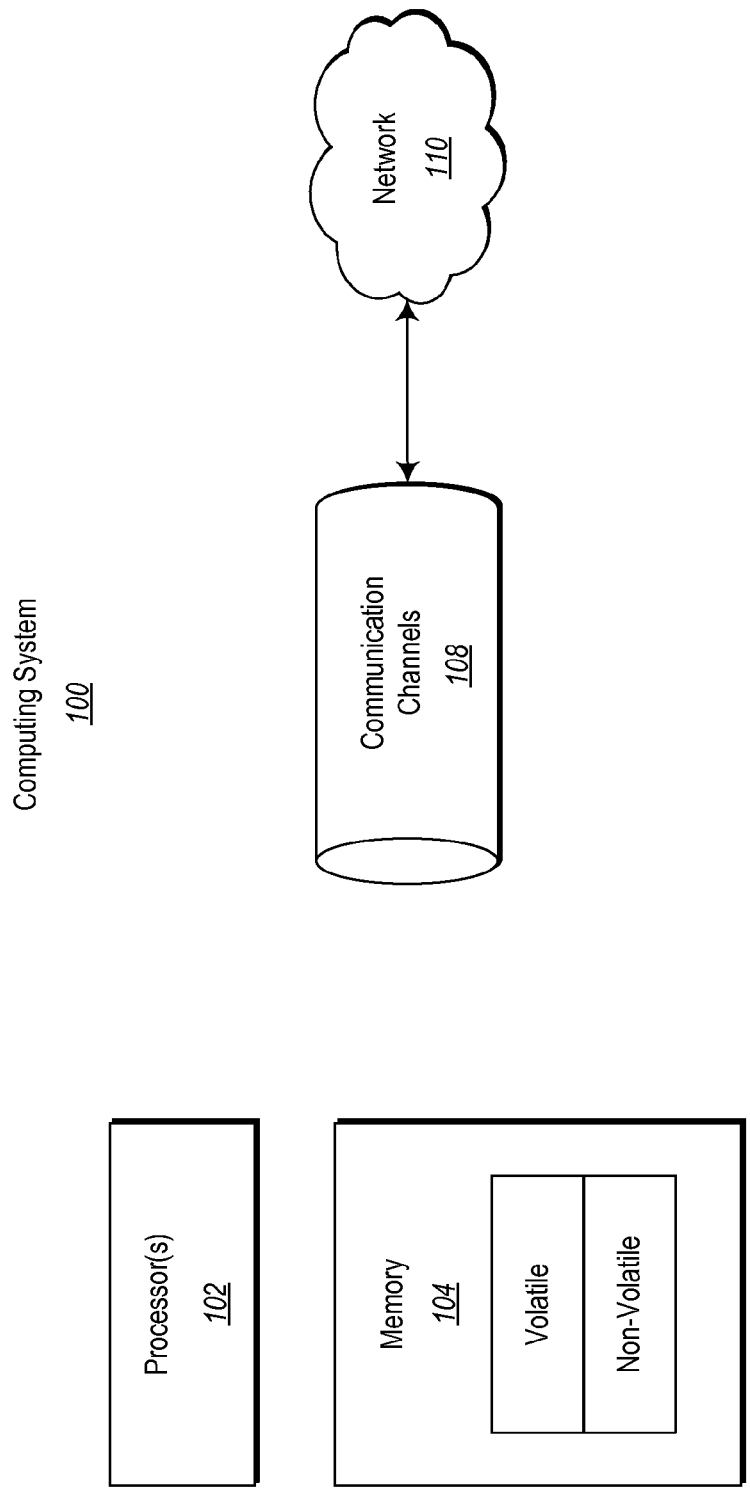
FIG. 1 illustrates a computing system in which some embodiments described herein may be employed.

In some instances a group of users may all have a social identity with a social network. The group of users may want to collaborate on a project idea using a collaborative application that is registered with the social network and that uses the social network for authentication. However, for various reasons such as privacy concerns, the group of users may not want to use their social identities when collaborating with each other in the collaborative application.

The group of users may all be associated with a common organization such as a common employer or they may be associated with different organizations. In any case, the individual members of the group should each have an identifier that is not associated with the social network, but that is instead associated with the common organization or the different organization.

At least some embodiments disclosed relate to systems and methods that allow collaboration of the group of users who use the collaborative application by linking the social identity with the identifier not related to the social network. The identifier not related to the social network may then be used when authenticating to the collaborative application to create a collaborative session. This provides for an efficient way for users to set up a collaborative session without the need to use their social identities and without the need to have an on premise copy of the collaborative application.

Accordingly, embodiments disclosed herein are related to systems and methods for a network entity to allow collaboration among end users of a collaborative application by using different identifiers. In one embodiment, a system includes a processor and a system memory. A receive module is configured to receive an authentication request from one or more collaborative applications. An authentication module is configured to use a first identifier for one or more end users that use the one or more collaborative applications. The first identifier is within a recognition domain and is used to verify that at least one end user is permitted to use at least one collaborative application. The authentication module is configured to send second data, which may not include the first identifier, to the collaborative application, the second data being structured to be interpretable by the collaborative application as meaning that the end user is permitted to use the collaborative application. A linking module is configured to receive a second identifier for the end user that is not at least initially in the recognition domain and to link the second identifier with the first identifier. This allows the second identifier to be used to authenticate the end user with the one of the one or more collaborative applications without the need to use the first identifier when the end user begins a collaborative session using the collaborative application.

Embodiments disclosed herein relate to methods for allowing collaboration among end users of a collaborative application by using an identifier of the end users that is different from a first identifier. A network entity receives an authentication request from a collaborative application to authenticate an end user. The network entity uses a first identifier of the end user that is associated with the network entity to verify that the end user is permitted to use the collaborative application and informs the collaborative application that the end user is permitted to use the collaborative application. The network entity receives from the collaborative application a second identifier of the end user that is not associated with the network entity. The second identifier is linked to the first identifier. The network entity allows the second identifier to be used to authenticate the user with the collaborative application without the need to use the first identifier when a collaborative session is begun.

Embodiments disclosed herein relate to computer program products and methods for allowing a network entity to facilitate the creation of a collaborative session between one or more end users and one or more collaborative applications that are associated with the network entity. The network entity receives from a collaborative application an identifier for an end user that is not at least initially associated with the network entity. The network entity verifies that the identifier is linked with an authentication identifier. The authentication identifier is within a recognition domain of the network entity. This allows the authentication identifier to be used by the network entity to verify that the end user is permitted to use the collaborative application. The network entity sends data to the end user that is associated with the identifier. The data allows the end user to access the collaborative application to thereby begin a collaborative session in the collaborative application.

Some introductory discussion of a computing system will be described with respect to FIG. 1. Then, the performance of a network entity to allow for the creation of a collaborative session between users of collaborative applications using a second identifier will be described with respect to FIGS. 2A through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor to thereby provision the computing system for a special purpose. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads). With such objects and processes operating upon the computing system, the computing system is the equivalent of a special purpose computer that functions for the special purpose accomplished by the objects.

In the description that follows, embodiments are described with reference to acts that are performed by one or more computing systems. If such acts are implemented in software, one or more processors (of the associated computing system that performs the act) direct the operation of the computing system in response to having executed computer-executable instructions, thereby converting and configuring the computing system for a more specialized purpose than without such direction. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also may include a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also may include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When data is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, and so forth) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2A:
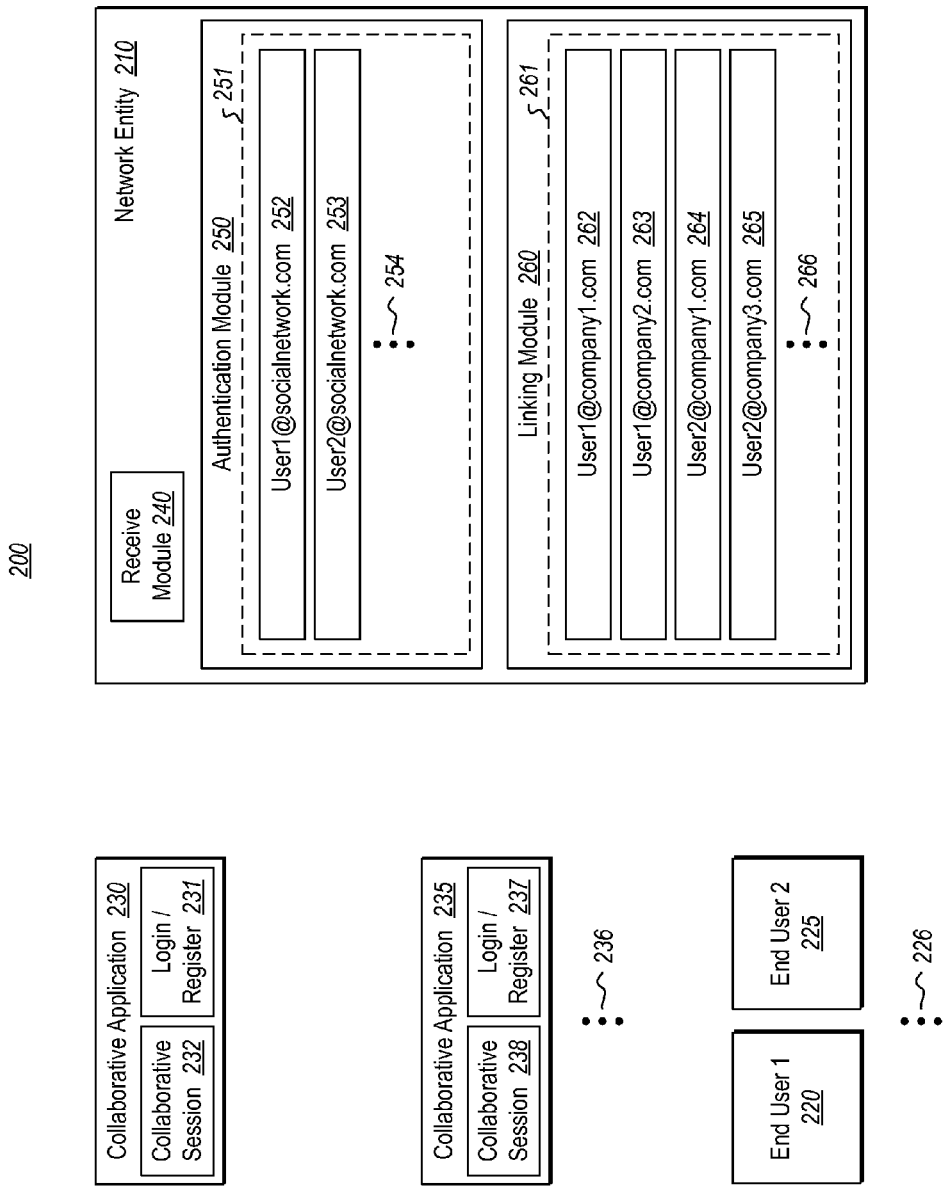
FIG. 2A illustrates an environment for a network entity to allow collaboration among users of a collaborative application.

FIG. 2A illustrates an environment for a network entity to allow collaboration among users of a collaborative application according to the embodiments disclosed here. As illustrated, the environment 200 includes a network entity 210, a first end user 220, a second end user 225, a first collaborative application 230 and a second collaborative application 235. However, the ellipses 226 represent that there may also be any number of additional end users. Likewise, the ellipses 236 represent that there may also be any number of additional collaborative applications. It will appreciated that the use of first, second, etc. in this description and in the claims to describe an element (e.g., first user, second user) is meant to distinguish one element from another and is not meant to imply sequential ordering unless explicitly stated.

The network entity 210 may be any network or the like that is used by or provides services to the multiple end users such as the end users 220, 225 and end users 226 and that allows the multiple end users to interact with each other in various ways. For example, the end users 220, 225, and 226 may have an account or other association with the network entity 210 that allows the end users to have access to or otherwise interact with the services and the like provided by the network entity 210. The networking entity 210 may be a local computing system or it may be a distributed computing system that includes elements resident in the cloud or that implement aspects of cloud computing.

In some embodiments, the network entity may be a social networking entity that provides a social identity to the end users 220 and 225 and potentially end users 226 and allows the end users to interact with each other in a social context as is typical of social networking entities. Examples of social networking entities include, but are not limited to, Microsoft Live, Facebook, LinkedIn, Google+, Pinterest, Amazon, and the like. It will be appreciated that in the case of the network entity 210 being a social networking entity, the number of end users 226 will be a large number that may well number in the millions, with no upper limit except those imposed by the capabilities of the network entity 210. Of course, the number of end users 226 may also be a large number for any network entity 210 that is not considered a common social networking entity. It will be appreciated that although the end users 220, 225, and potentially 226 will typically be a person, the end users 220, 225, and potentially 226 may also be organizations, business entities, and the like and may also include non-human computing systems, artificial intelligence and the like.

The network entity 210 may also be associated with or used by a number of collaborative applications such as the collaborative applications 230, 235 and potentially 236. In some embodiments, the collaborative applications are registered with the network entity 210. In the case of the network entity being a social networking entity, the number of collaborative applications 236 may be in the thousands or millions, with no upper limit except those imposed by the capabilities of the network entity 210. The collaborative applications may be implemented on a local computing system or may be implemented on a distributed computing system that includes elements resident in the cloud or that implement aspects of cloud computing.

In the embodiments disclosed herein and in the claims, a collaborative application is at least an application that allows the multiple end users 220, 225, and 226 to each individually access the application so that they may collaborate together on a project or the like. It will be appreciated that the collaboration need not take place at the same time as the end users may access the collaborative application at different times.

In some embodiments, the collaborative applications 230, 235, and potentially 236 may associate with the network entity 210 so that the end users 220, 225, and 226 are able to easily access the collaborative applications through the network entity 210. In addition, the collaborative applications may utilize the network entity 210 to provide authentication for the various end users. That is, the collaborative applications may use the association, such as an account identifier, that the end user has with the network entity 210 to verify the end user when the end user attempts to access the collaborative application. It will be appreciated that the collaborative applications 230, 235, and 236 may provide any number of services such as photo editing, document editing, project design, or any other reasonable service. Thus, the embodiments disclosed herein and the claims are not limited by the type of service provided by the collaborative applications.

The collaborative applications 230 and 235 may include a login/registration portion 231 and 237 that are used by the end users as will be explained in more detail to follow. In addition, as will be explained in more detail to follow, a collaborative session 232 may be implemented in the collaborative application 230 and a collaborative session 238 may be implemented in the collaborative application 235. The collaborative sessions represent a service that is provided by the collaborative application that may be used in a collaborative manner by the various end users. The collaborative sessions 232 and 238 may be implemented in the collaborative applications in a secure manner so that only those who have permission to access the sessions are able to use the service provided in the session. Although not illustrated, any collaborative applications 236 may also include a login/registration portion and may implement a collaborative session.

As illustrated in FIG. 2A, the network entity 210 includes various operational modules, all of which may be implemented as software, hardware, or a combination of software and hardware. The network entity 210 may include more or less than the modules illustrated in FIG. 2A and some of the modules may be combined as circumstances warrant.

Although not illustrated, the various modules of the network entity 210 may access and/or utilize a processor and memory, such as processor 102 and memory 104, as needed to perform their various functions.

The network entity 210 may include a receive module 240. In operation the receive module 240 communicates with the collaborative applications 230, 235, and potentially 236. In some embodiments to be described in more detail to follow, the receive module receives an authentication request for one or more of the end users 220, 225, or 226 from one or more of the collaborative applications 230, 235, or 236.

The network entity 210 also includes an authentication module 250. The authentication module includes or otherwise accesses a recognition domain 251 (illustrated by the dashed lines) that is used to store or otherwise access various identifiers for end users that have accounts with or are otherwise associated with the network entity 210. The identifiers may include identifiers 252, 253, and potentially any number of additional identifiers as illustrated by ellipses 254, with the upper limit being defined by the number of end users associated with the network entity 210. The identifiers 252, 253, and 254 may also be referred to as a first identifier or an authentication identifier in the embodiments disclosed herein and in the claims.

In some embodiments, the identifiers 252, 253, and 254 may be account identifiers that identify an account that each end user has with the network entity 210 and that thereby provide or link to information about the end user who owns the account. The account identifiers may be associated with a login name, user name, and/or email address that associates the end user 220, 225, or 226 with the network entity 210. Of course, it will be appreciated that the identifiers 252, 253, and 254 may be anything that associates an end user with the network entity 210. As will be described in more detail to follow, the authentication module 250 uses the identifiers 252, 253, and 254 to authenticate the end users 220, 225, and 226 with one or more of the collaborative applications 230, 235, and 236.

As illustrated in FIG. 2A, the identifier 252 may be an account identifier for the end user 220 (also referred to as End User 1). Thus, the identifier 252 may be illustrated as User1@socialnetwork.com, where social network refers to network entity 210. Likewise, the identifier 253 may be an account identifier for the end user 225 (also referred to as End User 2). Thus, the identifier 252 may be illustrated as User2@socialnetwork.com. Any identifiers 254 for any end users 226 may be similarly illustrated. As mentioned above, the structure or type of the identifier is unimportant as long as it associates the end user with the network entity.

The network entity may further include a linking module 260. The linking module 260 includes an identifier storage portion 261 (illustrated by the dashed lines) that stores or otherwise accesses second identifiers 262, 263, 264, 265, and potentially any number of additional second identifiers as illustrated by ellipses 266 that have been entered by the end users during the process that will be explained in more detail to follow. As will also be explained in more detail to follow, the linking module 260 links the second identifier with the first identifier so that the second identifier can be used by an end user to create and use a collaborative session in one or more of the collaborative applications. In the embodiments disclosed herein and in the claims, the second identifier may also be referred to simply as an identifier.

The second identifiers 262, 263, 264, and 265 are chosen by the end users 220, 225, and 226 and are typically associated with an entity or organization that is separate from the network entity 210. For example, in some embodiments the second identifiers may be an email address or the like that associates the end user with a business or other organization that the end user is part of, for example a place of employment. Of course, it will be appreciated that the second identifier may be anything that associates the end user with the entity that is separate from the network entity.

As illustrated in FIG. 2A, the second identifier 262 may be an email address for a first company that the end user 220 (also referred to as End User 1) works for or is otherwise associated with. Thus, the second identifier 262 may be illustrated as User1@Company1.com. The second identifier 263 may be an email address for a second company that the end user 220 works for or is otherwise associated with. Thus, the second identifier 263 may be illustrated as User1@Company2.com. Likewise, the second identifier 264 may be an email address for the first company that the end user 225 (also referred to as End User 2) also works for or is otherwise associated with. Thus, the second identifier 264 may be structured as User2@Company1.com. The second identifier 265 may be an email address for a company that the end user 225 works for or is otherwise associated with that the first user 220 is not associated with. Thus, the second identifier 265 may be illustrated as User2@Company3.com. As mentioned above, the structure or type of the second identifier is unimportant as long as it associates an end user with the entity that is different from the network identity 210.

Figure 2B:
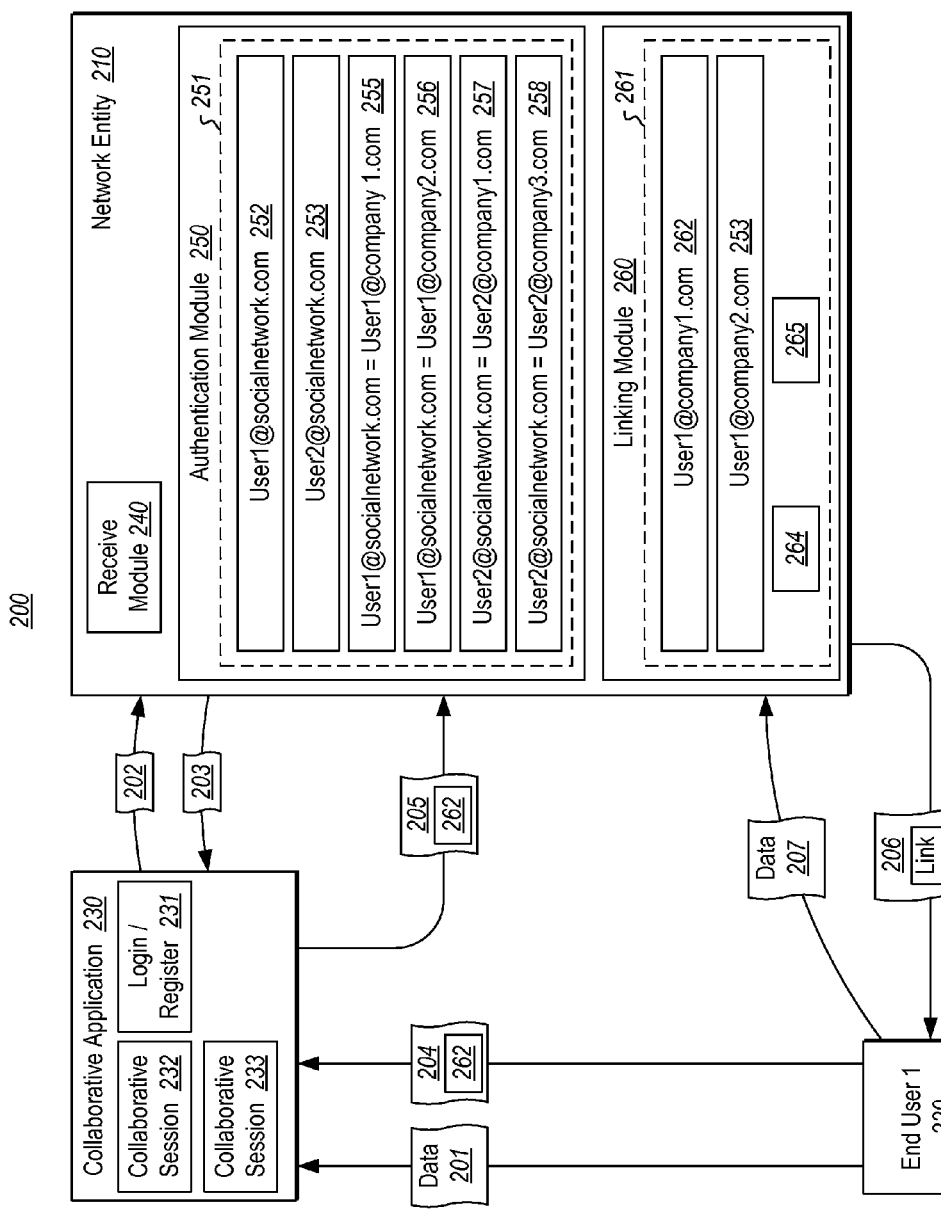
FIG. 2B illustrates a process flow for the network entity to link a second identifier with the first identifier.
Figure 2C:
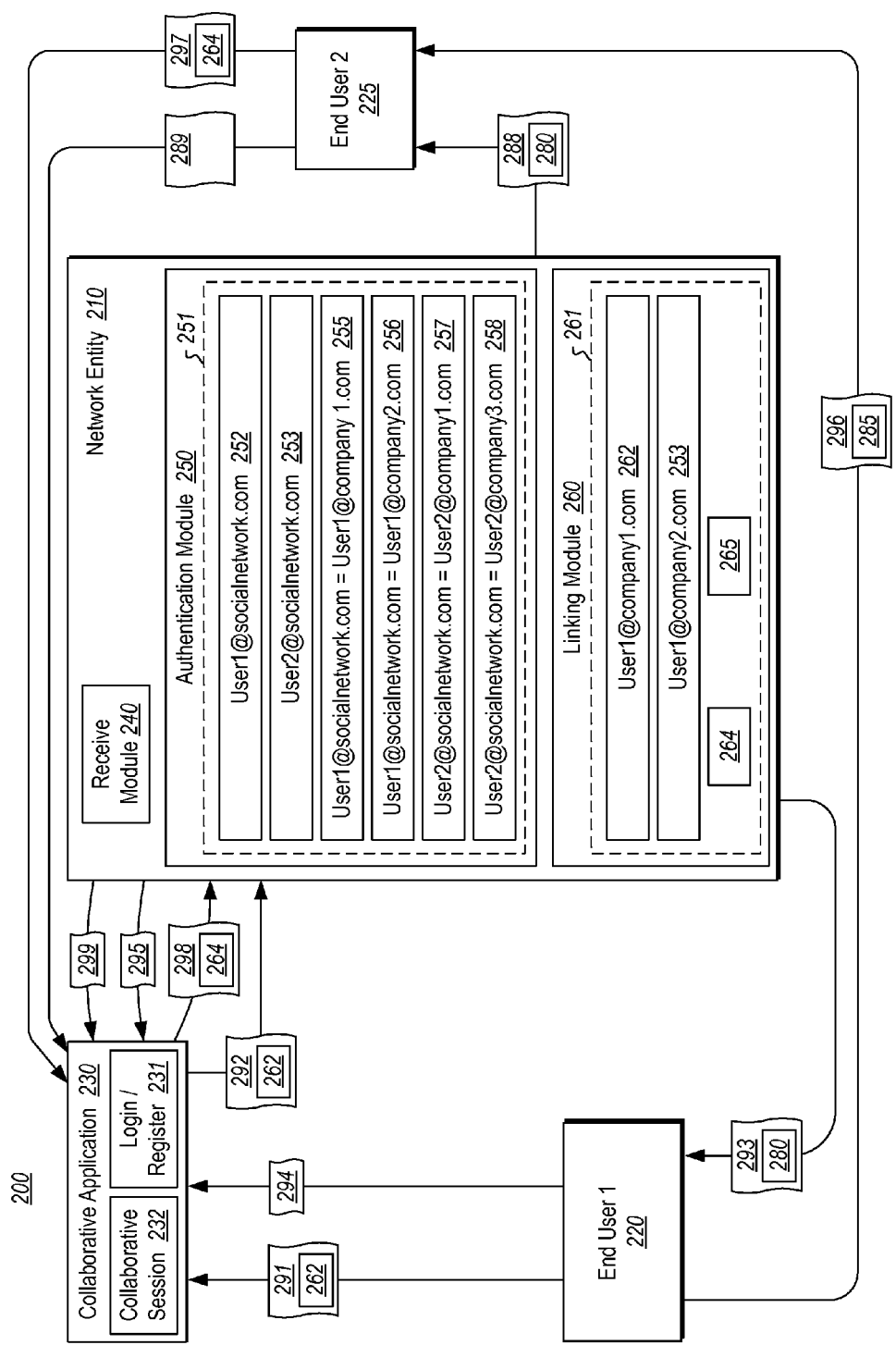
FIG. 2C illustrates a process flow for network entity to create a collaborative session between end users.

As discussed previously, the network entity 210 is able to link the second identifiers with the first identifiers so that the end users 220, 225, and/or 226 are able to use the second identifier to create a collaborative session in the collaborative applications 230, 235, and/or 236. Accordingly, FIGS. 2B-2C illustrate various process flows that illustrate how the network links the identifiers. It will be appreciated that FIGS. 2B-2C may omit some of the elements of FIG. 2A to focus in on the illustrated process flows. It will also be appreciated that the process flows illustrated in FIGS. 2B-2C are only examples of possible process flows and thus are not limiting. Accordingly, other process flows may be practiced by the embodiments disclosed herein.

FIG. 2B illustrates a process flow for the network entity 210 to link a second identifier with the first identifier for the end user 220. As illustrated, the end user 220 determines that the collaborative application 230 will work for the collaborative problem that he or she is trying to solve. Thus, the end user 220 activates the login/register portion 231 in the collaborative application 230 by entering data 201 that provides information about the end user that can be used in an authentication process. In response, the collaborative application 230 sends an authentication request data 202 to the network entity 210 for authentication. The authentication request may include information about the end user 220 and other needed information that will allow the network entity to authenticate the end user 220 to the collaboration application 230.

In response to receiving the authentication request 202, the network entity 210 uses the first identifier 252 to authenticate the end user 220. That is, the network entity 210 uses the first identifier 252 to verify the identity of the end user 220 and to verify that end user 220 has permission to use the collaborative application 230. It will be appreciated that the authentication process may be performed by the network entity 210 in any reasonable manner.

Once the network entity 210 has verified that the end user 220 is permitted to use the collaborative application, the network entity 210 sends authentication data 203 to the collaborative application 230. The authentication data 203 may be structured so as to be interpreted by the collaborative application 230 to mean that the end user 220 has permission to use the collaborative application 230. In some embodiments, the authentication data 203 may be authentication tokens or the like. The actual structure of the authentication data 203 is unimportant to the embodiments disclosed herein as long as the data is interpreted by the collaborative application 230 to mean that the end user 220 has permission to use the collaborative application 230.

The end user 220 is then prompted by the collaborative application 230 to enter a second identifier such as second identifier 262 as illustrated by data 204. The network entity 210 then receives the second identifier 262 from the collaborative network 210 as illustrated by data 205, where it is stored or otherwise accessed by the storage portion 261. The linking module 260 may then link the second identifier 262 with the identifier 252 so that the second identifier can be used to authenticate the end user 220 to the collaborative application 230 when creating a collaborative session 232 without the collaborative application or any other user being aware of the identifier 252.

In some embodiments, the network entity 210 sends out data 206 to the end user 220 to verify that that end user 220 is associated with the second identifier. In those embodiments where the second identifier 262 is an email address, the data 206 is sent to the end user 220 using the email address. The data 206 may also include a link 280 or the like that may be activated by the end user 220.

When the end user 220 activates the link 280, data 207 is sent to the network entity 210 that confirms to the network entity 210 that that the user 220 is in fact associated with the second identifier 262. Upon confirmation of the second identifier, the network entity 210 updates the recognition domain to reflect that the end user 220 is now associated with the second identifier 262. For example, as illustrated in FIG. 2B, the recognition domain 151 may be updated as shown at 255 that is illustrated as User1@socialnetwork.com=User1@Company1.com. Accordingly, since the first identifier 252 has been linked to the second identifier 262, the end user 220 may use the second identifier 252 to authenticate to the collaborative application 230 when setting up the collaborative session 232. The recognition domain entry 255 may also include scope information that further specifies that the second identifier may be used to authenticate to the collaborative application 220.

In some embodiments, activation of the link 280 also redirects the end user 220 back to the collaborative application 230. As will be described in further detail to follow, the end user is then able to log onto the collaborative application 230 and generate the collaborative session 232.

FIG. 2B is illustrated with respect to the end user 220 and the collaborative application 230 and shows how the second identifier 262 is linked with the first identifier 252. This will allow the end user to generate the collaborative session 232 as will be described in more detail to follow. There may be instances, however, when the end user 220 desires to link the second identifier 263 with the first identifier 252 so that he or she may generate a different collaborative session, such as collaborative session 233, in the collaborative application with a different group of end user than those using collaborative session 232. In such instances, the end user 220 may use the same process flow as described in FIG. 2B to link the second identifier 263 with the first identifier 252. This process will result in the recognition domain 251 being updated to reflect that the end user 220 is now associated with the second identifier 263. For example, as illustrated in FIG. 2B, the recognition domain 151 may be updated as shown at 256 that is illustrated as User1@socialnetwork.com=User1@Company2.com. Accordingly, since the first identifier 252 has been linked to the second identifier 263, the end user 220 may use the second identifier to authenticate to the collaborative application 230 when setting up the collaborative session 233.

There may also be instances when the end user 220 desires to set up a collaborative session in the collaborative application 235 or any collaborative applications 226. In such instances, the end user 220 may use the process flow of FIG. 2B with respect to collaborative application 235 to link the first identifier 252 of the end user 220 with either the second identifier 262 or the second identifier 263. In this case, however, the process flow begins when the end user 220 activates the login/registration portion 237 of the collaborative application 235. This process flow will result in the recognition domain 251 being updated in the manner previously described, which will then allow the end user to use the second identifier 262 or the second identifier 263 to authenticate to the collaborative application 235 when setting up the collaborative session 236. Additional collaborative sessions may also be implemented in the collaborative application 235 as needed using this process.

In like manner, the network entity 210 may use the process flow of FIG. 2B to link the second identifier 264 and/or 265 with the first identifier 253 of the end user 225. Upon confirmation of that second identifier 264 and/or 265 are associated with the end user 225, the network entity 210 updates the recognition domain in the manner previous described. For example, as illustrated in FIG. 2B, the recognition domain 151 may be updated with a new entry as shown at 257 that is illustrated as User2@socialnetwork.com=User2@Company1.com. The recognition domain 151 may also be updated with a new entry as shown at 258 that is illustrated as User2@socialnetwork.com=User2@Company2.com. Accordingly, since the first identifier 253 has been linked to the second identifier 264, the end user 225 may use the second identifier 264 to authenticate to the collaborative application 230 or collaborative application 235 (and perhaps the collaborative application 236) when setting up the collaborative session in one of the collaborative applications.

FIG. 2C illustrates a process flow for network entity 210 to create a collaborative session between the end users 220 and 225 and the collaborative application 230. It is noted that since FIG. 2C includes some of the same elements as FIGS. 2A and 2B, these elements may not be shown in as great detail in FIG. 2C to simply the explanation of the process flow and reference may be made to FIGS. 2A and 2B for the missing detail.

As illustrated, the end user 220, who has previously had the first identifier 252 linked with the second identifier 262 in the manner described in FIG. 2B, activates the login/register portion 231 in the collaborative application 230 and provides data 291 that includes the second identifier 262. The collaborative application may then provide data 292 to the network entity that includes the second identifier 262. As discussed above, the second identifier 262 is not associated with the network entity 210, but is rather associated in this case with Company1, the end user's employer. Specially, the second identifier 262 is an email address for the Company1 that is associated with the end user 220.

Upon receiving the second identifier 262, the network entity 210 uses the second identifier to authenticate the end user 220. In this case, the network entity verifies that that the second identifier 262 is linked with the first or authentication identifier 252. Since the identifiers are associated because they have been linked to each other, the network entity is able to authenticate that the end user 220 has permission to use the collaborative application 230. The network entity 210 may communicate the authentication to the collaborative network 230 via data 295 as shown in the process flow. The data 295 may include authentication tokens or the like that verify that the end user 220 is permitted to use the collaborative application.

The network entity then sends data 293 including the link 280 to the end user 220. The data 293 may include authentication information that is used to verify the authentication such as authentication tokens if such has not previously been communicated to the collaborative application 230. In some embodiments, the network entity 210 may send the data 293 to the end user 220 using the email address constituting the second identifier 262.

The end user 220 may then active the link 280, upon which the end user may be redirected to the collaborative application 230, where the user will be authenticated to the collaborative application as indicated by data 294. The end user 220 will be able to begin the collaborative session 232. Alternatively, if the collaborative session has already been begun, the end user 220 will see an updated version of the collaborative session 232 that includes any changes made by other end users who have access to the collaborative session.

In some embodiments, the end user 220 may be required to perform this process every time he or she uses the collaborative application 230 to access the collaborative session 232. However, in other embodiments the data 293 may include information that specifies a predetermined amount of time that the end user 220 may access the collaborative session 232 before needing to login and be authenticated in the manner described. In some embodiments, the predetermined time may be a time period such as an hour, a number of hours, a day or a number of days. The predetermined time may also specify that the end user 220 is always authenticated.

In some embodiments, once the end user 220 is authenticated to the collaborative application 230 and has begun the collaborative session 232, the end user 220 may send an invitation 296 via email or some other similar communication such as SMS to the end user 225 inviting the end user 225 to join the collaborative session 232. The invitation 296 may include a link 285 that, when activated by the end user 225, directs the end user 225 to the collaborative application 230.

In those instances where the end user 225 has not previously linked his or her first identifier 253 with the second identifier 264, the end user 225 makes the link as described in FIG. 2B. However, if the link has previously occurred, or after the process of FIG. 2B is completed, the end user 225 activates the login/register portion 231 in the collaborative application 230 and provides data 297 that includes the second identifier 264. The collaborative application may then provide data 298 to the network entity that includes the second identifier 264. As discussed above, the second identifier 264 is not associated with the network entity 210, but is rather associated in this case with Company1, the end user 225's employer. Specially, the second identifier 264 is an email address for the Company1 that is associated with the end user 225.

Upon receiving the second identifier 264, the network entity 210 uses the second identifier to authenticate the end user 225. In this case, the network entity verifies that that the second identifier 264 is associated with the first or authentication identifier 253. Since the identifiers are linked, the network entity is able to authenticate that the end user 225 has permission to use the collaborative application 230. The network entity 210 may communicate the authentication to the collaborative network 230 via data 299 as shown in the process flow. The data 299 may include authentication tokens or the like that verify that the end user 225 is permitted to use the collaborative application.

The network entity then sends data 288 including the link 280 to the end user 225. The data 288 may include authentication information that is used to verify the authentication such as authentication tokens if such has not previously been communicated to the collaborative application 230. In some embodiments, the network entity 210 may send the data 288 to the end user 225 using the email address constituting the second identifier 264.

The end user 225 may then active the link 280, upon which the end user may be redirected to the collaborative application 230, where the user will be authenticated to the collaborative application as indicated by data 289. The end user 225 will be able to see the collaborative session 232 and will be able make changes to the collaborative session 232. The end user 225 will also see the updated version of the collaborative session 232 that includes any changes made by other end users who have access to the collaborative session.

For example, suppose the collaborative application 230 is an architectural application that allows users to design a building. Further suppose that end user 220 and end user 225 are both architects at the same architectural firm. When the end user 220 begins the collaborative session 232 in the manner described in FIG. 2C, he or she may begin work on the design of a particular building. The end user 225 may then access the collaborative session in the manner described in FIG. 2C at a different time and may update the building design. The next time that end user 220 access the collaborative session 232, he or she will see the updates to the design done by end user 225 and can provide further updates as needed. In this way, the end users 220 and 225 (and any number of additional end users 226) can collaborate using the collaborative application 230 without the need to actually have a premise copy of the application.

The process flow of FIG. 2C illustrated the case where the end users 220 and 225 both were employees of Company1. Such instances may be useful as the embodiments disclosed herein provide an efficient way for employees of the same company to form and use collaborative sessions in collaborative application 230 without the need for an on premise version of collaborative application 230. In addition, the embodiments disclosed herein help ensure that the end users 220 and 225 need not provide their social identifiers to the other user before using the collaborative application 230 if they do not want to. Further, such instances may prompt the Company1 to add an on premise version of collaborative application 230 if a large number of their employees are using the application to increase efficiency. Accordingly, the embodiments disclosed herein may provide a way for the network entity 210 and/or one or more of the collaborative applications to market the application to a company or business since the employees can use the application prior to obtaining the on premise version.

However, the process flow of FIG. 2C may be used in instances that the end user 220 and the end user 225 are employees of different companies or are otherwise associated with different organizations. In such cases, the end user 220 may begin the collaborative session 232 using the second identifier 262 that is associated with Company 1 as previously described. The end user 220 may then send the invitation 296 to an end user 225 that is an employee of or otherwise associated with Company 2. The end user 225 may then use the second identifier 265 that is associated with Company 2 to authenticate with the collaborative application 230 to gain access to the collaborative session 232 in the manner previously described. In this way, the embodiments disclosed herein provide for a way for members of different organizations or entities to use collaborative sessions as circumstances warrant.

Figure 3:
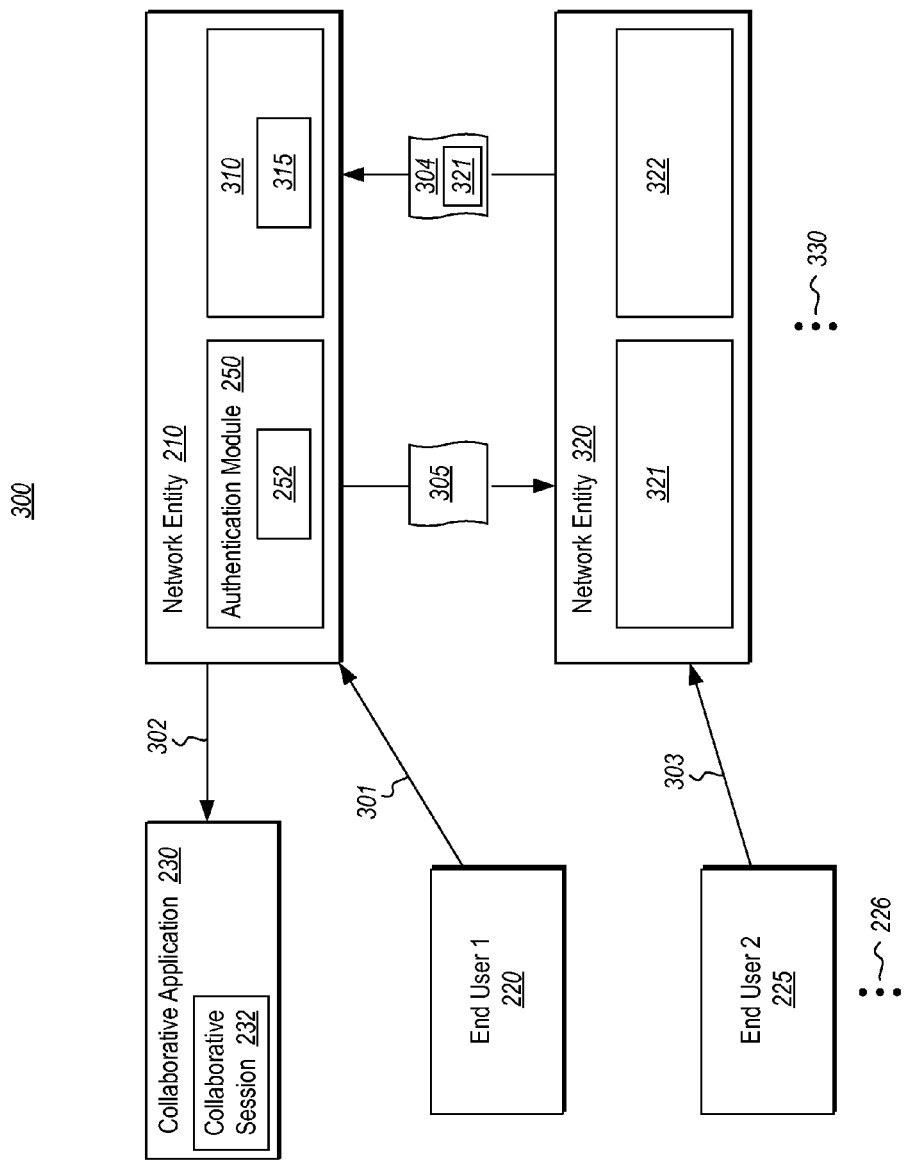
FIG. 3 illustrates an alternative environment for a network entity to allow collaboration among users of a collaborative application.

FIG. 3 illustrates an alternative environment 300 for a network entity to allow collaboration among users of a collaborative application. As illustrated, the environment 300 includes several elements previously discussed in relation to environment 200 and these elements need not be described again. The environment 300 includes an additional networking entity 320 and potentially any number of networking entities as illustrated by ellipses 330. The networking entities 320 and 330 may correspond to the networking entity 210 and thus any description of the networking entity 210 may also apply to the networking entities 320 and 330.

In the environment 300, the end user 220 may be associated with the network entity 210 and may begin and use the collaborative session 232 in the manner previously described as illustrated by 301 and 302. However, the end user 225 may not be associated with the network entity 210, but may rather be associated with the network entity 320 and the end users 226 may be associated with one or more of the network entities 330. The network entity 320 may store or have access to a first identifier 321 that associates the end user 225 with the network entity 320 and a second identifier that associates the end user 225 with an entity that is separate from the network entity 320.

In the environment 300, the collaborative application 230 is associated with the network entity 210. In some embodiments, however, the collaborative application is not associated with the network entity 320. In such embodiments, the network entity 210 may also include a second recognition domain 310 that stores or otherwise accesses an identifier 315. Unlike the identifiers previously discussed, the identifier 315 may be associated with the network entity 320 and may be used to verify that the end user 225 is associated with the network entity 320.

When the end user 225 is invited to join the collaborative session 232 or otherwise desires to join the session, the network entity 210 may receive from the network entity 320 data 304. The data 304 may include the first identifier 321 and may be structured to verify that the end user 225 is associated with the network entity 320. For example, the network entity 210 may compare the data 304 with the identifier 315 to verify that the end user 225 has an account with or is otherwise associated with the network entity 320. This allows the network entity 210 to verify that the end user 225 is trusted to use the collaborative application 230 to thereby access the collaborative session 332.

The network entity 210 may then provide data 305 to the network entity 320. The data 305 may be structured to allow the network entity 310 to link the first identifier 321 that is associated with the network entity 320 with a second identifier such as the identifier 322 in the manner previously described as illustrated by 303. Once the network entity 310 has linked the identifier 321 and the identifier 322, the end user 225 may use the collaborative application 230 to thereby access the collaboration session 232 in the manner previously described.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
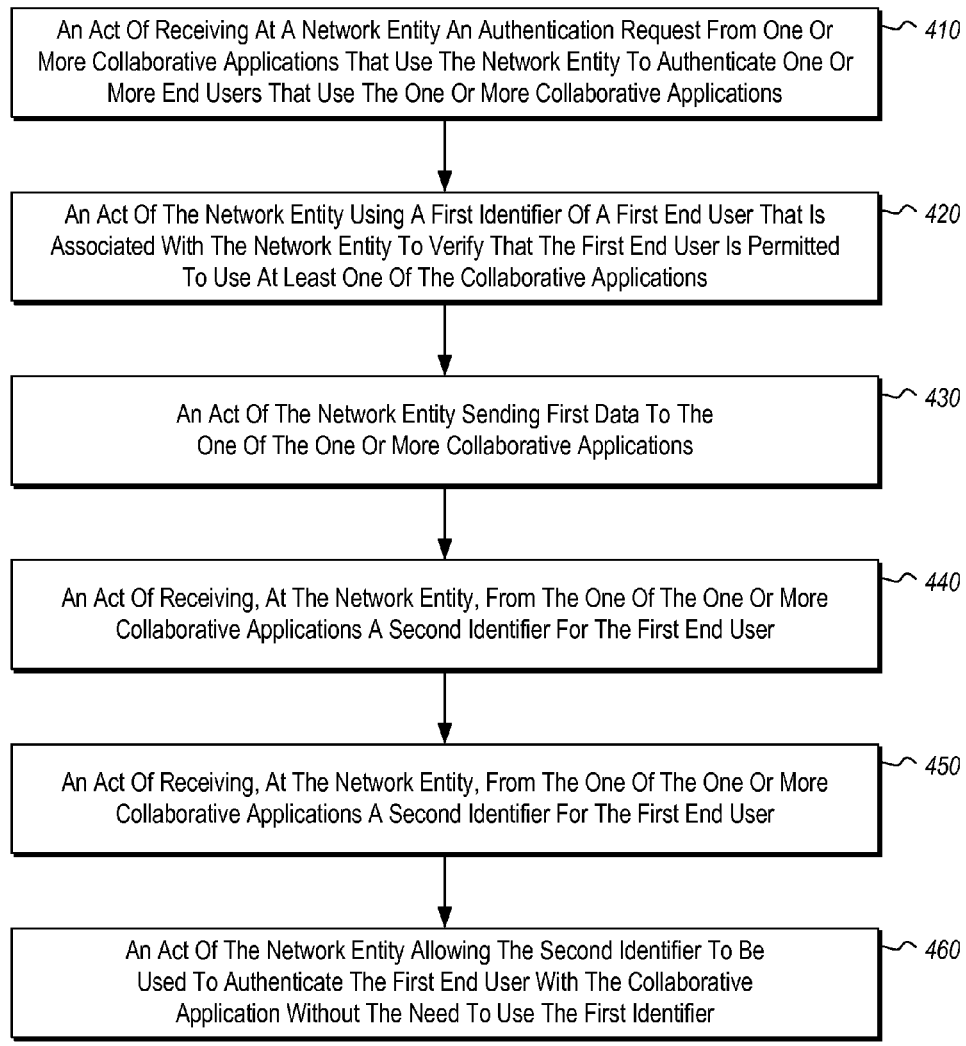
FIG. 4 illustrates a flow chart of an example method for a network entity to allow collaboration among users of a collaborative application.

FIG. 4 illustrates a flow chart of an example method 400 for a network entity to allow collaboration among users of a collaborative application by using an identifier of the users that is different from a first identifier. The method 400 will be described with the respect to FIG. 2B described above.

The method 400 includes an act of receiving at a network entity an authentication request from one or more collaborative applications that use the network entity to authenticate one or more end users that use the one or more collaborative applications (act 410). For example, as explained previously the network entity 210 receives an authentication request 202 from the collaborative application 230 to authenticate the end user 220.

The method 400 includes an act of the network entity using a first identifier of a first end user that is associated with the network entity to verify that the first end user is permitted to use at least one of the collaborative applications (act 420). The first identifier is within a recognition domain of the network entity. For example, as previously described, the network entity 210 includes the first identifier 252 that is stored or otherwise accessible by the recognition domain 251. The first identifier 252 is associated with the end user 220 and may be an account that the end user 220 has with the network entity 210.

The method 400 includes an act of the network entity sending first data to the one of the one or more collaborative applications (act 430). The first data is structured to be interpretable by the one of the one or more applications as meaning that the first end user is permitted to use the one of the one or more collaborative applications. For example, as previously described the in response to verifying that the end user 220 is permitted to use the collaborative application 230, the network entity sends the data 203 to the collaborative application 230. The data 203 informs the collaborative application 230 that the end user 220 is authenticated. In some embodiments, the data 203 may be an authentication token.

The method 400 includes an act of receiving, at the network entity, from the one of the one or more collaborative applications a second identifier for the first end user (act 440). The second identifier is not at least initially being within the recognition domain of the network entity. For example, as previously described the end user 220 enters the second identifier 262 when prompted by the collaborative application 230 as shown by data 204. The collaborative application then provides the second identifier 262 to the network application 215 as shown by data 205. The second identifier is stored or otherwise accessed by the storage portion 261 of the linking module 260.

The method 400 includes an act of linking the second identifier with the first identifier (act 450) and an act of the network entity allowing the second identifier to be used to authenticate the first end user with the collaborative application without the need to use the first identifier (act 460). This allows the first end user to begin a collaborative session using the collaborative application. For example, the linking module 260 links the first identifier 252 and the second identifier 262 and updates the recognition domain 251 to reflect this as shown by 255. The end user is then able to use the collaborative application 230 to begin the collaborative session 232 as previously described.

In some embodiments, the network entity 230 sends data 206 to the end user 220 to verify that the end user 220 is associated with the second identifier. Upon receipt of the data 207 that confirms the association, the recognition domain is updated.

Figure 5:
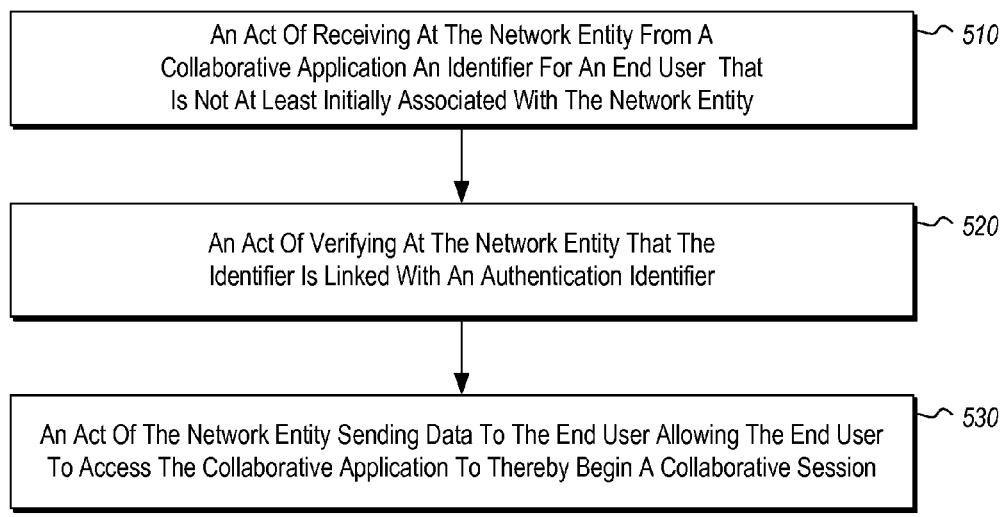
FIG. 5 illustrates a flow chart of an example method for allowing a network entity to create a collaborative session between one or more end users and one or more collaborative applications.

FIG. 5 illustrates a flow chart of an example method 500 for allowing a network entity to facilitate the creation of a collaborative session between one or more end users and one or more collaborative applications. The method 500 will be described with the respect to FIG. 2C described above.

The method 500 includes an act of receiving at the network entity from one of the one or more collaborative applications an identifier for one of the one or more end users that is not at least initially associated with the network entity (act 510). For example, as previously described the end user 220 enters the identifier 262 when prompted by the collaborative application 230 as shown by data 291. The collaborative application then provides the identifier 262 to the network application 215 as shown by data 292. As described previously, the identifier is not associated with network entity, but is associated with a different entity such as the Company1.

The method 500 includes an act of verifying at the network entity that the identifier is linked with an authentication identifier (act 520). The authentication identifier is within the recognition domain of the network entity such that the authentication identifier is able to be used by the network entity to verify that the one of the one or more users is permitted to use the one of the one or more collaborative applications. For example, the identifier 262 is linked with the authentication or first identifier 252 in the manner previously discussed by the linking module 260 as indicated by 255. Accordingly, the network entity 210 is able to verify that the identifier received from the collaborative application 230 is linked with the authentication identifier. Since the authentication identifier 252 is part of the recognition domain, it is able to be used to verify that the end user 220 is permitted to use the collaboration application 230.

The method 500 includes 5 figures (act 530). The data is associated with the identifier. For example, as previously described the network entity provides the data 293 with the link 280 to the end user 220. The end user is able to use the link 280 to access the collaborative application 230 in an authenticated manner and to begin the collaborative session 232 or to access a collaborative session that is ongoing.

In some embodiments, the end user 220 may send the invitation 296 to the end user 225. The end user 225 then uses his or her second identifier to authenticate to with the collaborative application in the same manner as end user 220. The end user 225 is then able to access the collaborative session 232.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
 a processor;
 a system memory;
 a receive module configured to receive an authentication request from a collaborative application, the authentication request including registration information of a user who is registering with the collaborative application in order to begin an initial collaborative session, the user's registration information being configured to enable the system to use the registration information to identify both a system-side user account of the user and an existing first identifier of the user's system-side user account, the user's registration information including identifying information about the user so that the user's system-side user account and the user's existing first identifier are identifiable using the identifying information, the identifying information not including an existing username of the user, whereby the system uses the registration information, as opposed to the user's existing username, to initially identify the user's system-side user account and to obtain the existing first identifier;
 an authentication module configured to use the existing first identifier to authenticate the user, the existing first identifier having been previously saved within a recognition domain and being used to verify that the user is permitted to use the collaborative application, the authentication module being further configured to send second data to the collaborative application, the second data being structured to be interpretable by the collaborative application as meaning that the user is permitted to use the collaborative application such that the user is authenticated with the collaborative application; and
 a linking module configured to receive a second identifier for the user, the second identifier not at least initially being in the recognition domain such that the second identifier is not identified as the user's existing username, the linking module being further configured to link the second identifier with the existing first identifier so that the second identifier is usable to authenticate the user with the collaborative application during a subsequent collaborative session without needing to use the existing first identifier when the user begins the subsequent collaborative session using the collaborative application, wherein the second identifier is received at the linking module after the user is already authenticated, the second identifier being sent to the linking module in response to a request sent to the user after the user is already authenticated, and wherein, after the initial collaborative session has started, a selectable link is transmitted to a second user to invite the second user to join the initial collaborative session with the user, the selectable link, when activated by the second user, enabling the second user to interact directly with the collaborative application to join the initial collaborative session;
 whereby the user is authenticated without ever inputting the user's existing username.

2. The system of claim 1, wherein the existing first identifier is a previously saved username that the user has with the system.

3. The system of claim 1, wherein the existing first identifier is associated with a network entity, and wherein the second identifier is chosen by the user and is not initially associated with the network entity.

4. The system of claim 1, wherein the system is a social network that is configured to be associated with a plurality of collaborative applications and a plurality of end users.

5. A computer-implemented method for authenticating an end user who is registering with a collaborative application in order to begin an initial collaborative session, the method comprising:
 an act of receiving at a network entity an authentication request from the collaborative application, the collaborative application using the network entity to authenticate the end user, wherein the authentication request includes registration information of the end user, the end user's registration information being usable to identify both a network-entity-side user account of the end user and an existing first identifier of the end user's network-entity-side user account, the end user's registration information including identifying information about the end user so that the end user's network-entity-side user account and the end user's existing first identifier are identifiable using the identifying information, the identifying information not including an existing username of the end user, whereby the registration information, as opposed to an existing username, is used to initially identify the end user's network-entity-side user account and to obtain the first identifier;
 an act of the network entity using the existing first identifier to authenticate the end user, the existing first identifier being associated with the network entity, the existing first identifier having been previously saved within a recognition domain of the network entity and being used by the network entity to verify that the end user is permitted to use the collaborative application;
 in response, an act of the network entity sending first data to the collaborative application, the first data being structured to be interpretable by the collaborative application as meaning that the end user is permitted to use the collaborative application such that the end user is authenticated with the collaborative application;
 an act of receiving, at the network entity and from the collaborative application, a second identifier for the end user, the second identifier not at least initially being within the recognition domain of the network entity such that the second identifier is not identified as the end user's existing username, wherein the second identifier is received after the end user is already authenticated, the second identifier being received in response to a request that was sent to the end user after the end user is already authenticated;
 an act of linking the second identifier with the existing first identifier;
 an act of the network entity allowing the second identifier to be used to authenticate the end user with the collaborative application during a subsequent collaborative session without needing to use the existing first identifier when the end user begins the subsequent collaborative session using the collaborative application; and
 after the initial collaborative session has started, a selectable link is transmitted to a second end user to invite the second end user to join the initial collaborative session with the end user, the selectable link, when activated by the second end user, enabling the second end user to interact directly with the collaborative application to join the initial collaborative session;
 whereby the end user is authenticated without ever inputting the user's existing username.

6. The computer-implemented method of claim 5, wherein the act of the network entity allowing the second identifier to be used to authenticate the end user with the collaborative application during the subsequent collaborative session without needing to use the existing first identifier comprises:
an act of the network entity sending second data to the end user, the second data being associated with the second identifier; and
an act of the network entity receiving third data from the end user, the third data verifying that the end user is associated with the second identifier.

7. The computer-implemented method of claim 5, wherein the act of the network entity allowing the second identifier to be used to authenticate the end user with the collaborative application during the subsequent collaborative session without needing to use the existing first identifier comprises:
an act of the network entity sending fourth data to the collaborative application, the fourth data being structured to be interpretable by the collaborative application as meaning that the second identifier is able to be entered into the collaborative application by the end user to begin the initial collaborative session using the collaborative application.

8. The computer-implemented method of claim 5, further comprising:
an act of receiving at the network entity a second authentication request from a second collaborative application;
an act of the network entity using the existing first identifier of the end user to verify that the end user is permitted to use the second collaborative application;
in response, an act of the network entity sending fifth data to the second collaborative application, the fifth data being structured to be interpretable by the second collaborative application as meaning that the end user is permitted to use the second collaborative application;
an act of receiving, at the network entity, from the second collaborative application a third identifier for the end user, the third identifier not at least initially being within the recognition domain of the network entity;
an act of linking the third identifier with the existing first identifier; and
an act of the network entity allowing the third identifier to be used to authenticate the end user with the second collaborative application without using the existing first identifier when the end user begins a second collaborative session using the second collaborative application.

9. The computer-implemented method of claim 5, wherein the networking entity is a social networking entity that is configured to be associated with a plurality of collaborative applications and a plurality of end users.

10. The computer-implemented method of claim 5, wherein the existing first identifier is an account identifier that the end user has with the network entity.

11. The computer-implemented method of claim 5, wherein the existing first identifier is associated with the network entity, and wherein the second identifier is chosen by the end user and is not associated with the network entity.

12. The computer-implemented method of claim 5, further comprising:
an act of receiving at the network entity a third authentication request from the collaborative application;
an act of the network entity using a first identifier of the second end user that is associated with the network entity, the first identifier of the second end user being used by the network entity to verify that the second end user is permitted to use the collaborative application;
in response, an act of the network entity sending sixth data to the collaborative application, the sixth data being structured to be interpretable by the collaborative application as meaning that the second end user is permitted to use the collaborative application;
an act of receiving, at the network entity, from the collaborative application a second identifier for the second end user, the second identifier of the second end user not at least initially being within the recognition domain of the network entity;
an act of linking the second identifier of the second end user with the first identifier of the second user; and
an act of the network entity allowing the second identifier of the second end user to be used to authenticate the second end user with the collaborative application without using the first identifier of the second end user when the second end user enters the initial collaborative session begun by the first end user.

13. The computer-implemented method of claim 12, wherein the second identifier of the second end user and the second identifier of the end user are identifiers for different entities.

14. The computer-implemented method of claim 5, further comprising:
an act of receiving at the network entity seventh data from a second network entity, the seventh data being associated with a second recognition domain of the network entity, the seventh data being structured to verify that the second end user who has an identifier associated with the second network entity is trusted to use the identifier associated with the second network entity to authenticate with the collaborative application; and
sending eighth data to the second network entity, the eighth data being structured to allow the second network entity to link a second identifier of the second user with the identifier associated with the second network entity so that the second end user is able to join the initial collaborative session with the end user.

15. One or more hardware storage devices having stored thereon computer-executable instructions, the computer-executable instructions being executable by one or more processors of a computing system to cause the computing system to perform a method for allowing a network entity to facilitate creation of an initial collaborative session between one or more end users and a collaborative application that is associated with the network entity, the method comprising:
receiving at the network entity from the collaborative application an authentication request to authenticate a first end user, wherein the authentication request includes registration information of the first end user, the first end user's registration information being usable to identify both a network-entity-side user account of the first end user and an existing identifier of the first end user's network-entity-side user account, the first end user's registration information including identifying information about the first end user so that the first end user's network-entity-side user account and the first end user's existing identifier are identifiable using the identifying information, the identifying information not including an existing username of the first end user, whereby the registration information, as opposed to an existing username, is used to initially identify the first end user's network-entity-side user account and to obtain the identifier;

verifying at the network entity that the existing identifier is an existing authentication identifier, the authentication identifier being within a recognition domain of the network entity such that the authentication identifier is able to be used by the network entity to verify that the first end user is permitted to use the collaborative application;

in response to verifying that the first end user is permitted to use the collaborative application, the network entity sending data to the first end user, the data being associated with the authentication identifier, the data allowing the first end user to access the collaborative application to thereby begin the initial collaborative session using the collaborative application such that the first end user is authenticated with the collaborative application;

after the first end user is authenticated with the collaborative application, sending a request to the first end user, the request inviting the first end user to provide a second identifier that is usable to authenticate the first end user during a subsequent collaborative session, the second identifier being different than the first end user's existing identifier; and after the initial collaborative session has started, transmitting a selectable link to a second end user to invite the second end user to join the initial collaborative session with the first end user, the selectable link, when activated by the second end user, enabling the second end user to interact directly with the collaborative application to join the initial collaborative session.

16. The one or more hardware storage devices of claim 15, the method further comprising:

receiving at the network entity from the collaborative application a second identifier for the second end user, the second identifier not at least initially being associated with the recognition domain of the network entity;

verifying that the second identifier for the second end user is associated with a second authentication identifier, the second authentication identifier being within the recognition domain of the network entity such that the second authentication identifier is able to be used by the network entity to verify that the second end user is permitted to use the collaborative application; and in response to verifying that the second end user is permitted to use the collaborative application, sending data to the second end user, the data being associated with the second identifier for the second end user, the data allowing the second end user to access the initial collaborative session begun by the first end user.

17. The one or more hardware storage devices of claim 15, wherein the data that allows the first end user to access the collaborative application is useable by the first end user for a predetermined amount of time.

18. The one or more hardware storage devices of claim 15, the method further comprising:

receiving, at a second network entity that is different from the first network entity, from the collaborative application a second identifier for the second end user, the second identifier not at least initially being associated with the recognition domain of the network entity;

verifying at the second network entity that the second identifier for the second end user is associated with a second authentication identifier, the second authentication identifier being within a recognition domain of the second network entity such that the second authentication identifier is able to be used by the second network entity to verify that the second end user is permitted to use the collaborative application; and in response to verifying that the second end user is permitted to use the collaborative application, sending from the second network entity data to the second end user, the data being associated with the second identifier, the data allowing the second end user to access the initial collaborative session begun by the first end user.

19. The one or more hardware storage devices of claim 18, wherein the network entity is a first social networking entity that is configured to be associated with a plurality of collaborative applications and a plurality of end users and the second network entity is a second social networking entity that is configured to be associated with the plurality of collaborative applications and the plurality of end users.

20. A computer system comprising:

one or more processors; and one or more computer-readable hardware storage media having stored thereon computer-executable instructions that are executable by the one or more processors and that cause the computer system to establish a link between two user accounts by causing the computer system to:

receive, from a collaborative application, data entered by a user who is attempting to access the collaborative application, the data being usable by the computer system to identify both a system-side user account of the user and an existing first identifier of the user's system-side user account, the user's data including identifying information about the user so that the user's system-side user account and the user's existing first identifier are identifiable using the identifying information, the identifying information not including an existing username of the user, whereby the data, as opposed to an existing username, is used to initially identify the user's system side user account and to obtain the first identifier;

use the user data and the existing first identifier of the user to authenticate the user with the collaborative application, the existing first identifier having been previously saved in storage;

upon successfully authenticating the user with the collaborative application, notify the collaborative application that the user is authenticated and that the user is permitted to begin a collaborative session of the collaborative application;

receive a second identifier, wherein the second identifier was initially received at the collaborative application in response to a prompt that prompted the user to enter the second identifier even though the user is already authenticated;

link the existing first identifier and the second identifier together, whereby, after the link, the second identifier is usable to successfully authenticate the user during a subsequent authentication between the user and the collaborative application, whereby the user is able to be authenticated without ever inputting the user's existing username; and after the user has begun the collaborative session, a selectable link is transmitted to a second user to invite the second user to join the collaborative session with the user, the selectable link, when activated by the second user, enabling the second user to interact directly with the collaborative application to join the collaborative session.

21. The computer system of claim 20, wherein the selectable link is transmitted from the user to the second user via a short message service (SMS).

22. The computer system of claim 20, wherein the user is authenticated for only a predetermined amount of time, and wherein after the predetermined amount of time has elapsed, the user is required to authenticate again.

\* \* \* \* \*